(No Model.)
J. L. WAGENER.
CULTIVATOR.
No. 466,203. Patented Dec. 29, 1891.
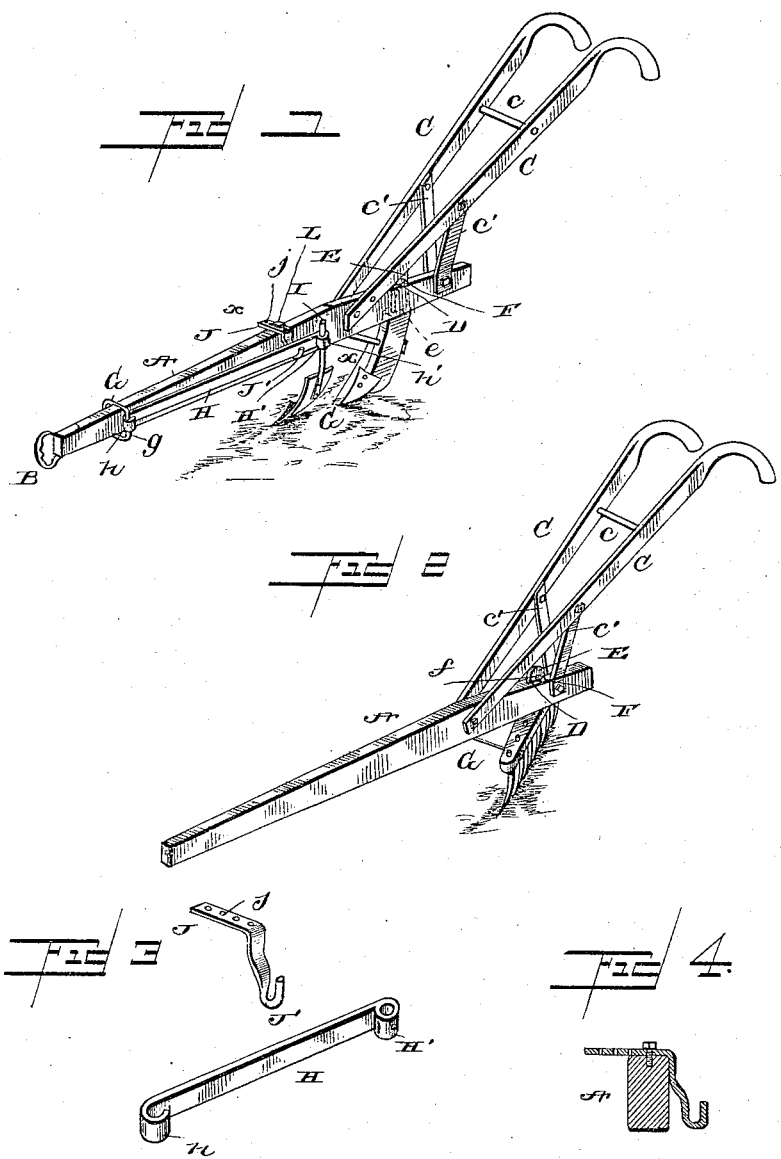
Witnesses
John Imurie
[signature]
Inventor
John L. Wagener,
By his Attorney
J. R. Littell

UNITED STATES PATENT OFFICE.

JOHN L. WAGENER, OF OAKLAND, TENNESSEE.

CULTIVATOR.

SPECIFICATION forming part of Letters Patent No. 466,203, dated December 29, 1891.

Application filed August 15, 1891. Serial No. 402,746. (No model.)

*To all whom it may concern:*

Be it known that I, JOHN L. WAGENER, a citizen of the United States, residing at Oakland, in the county of Fayette and State of Tennessee, have invented certain new and useful Improvements in Cultivators; and I do hereby declare that the following is a full, clear, and exact description of the invention, which will enable others skilled in the art to which it appertains to make and use the same.

This invention relates to cultivators; and it has for its object to provide an implement of this character in which the tools are removable and interchangeable, whereby the implement is designed to be adapted for its various uses.

A further object of the invention is to provide an implement of this character which will possess advantages in point of simplicity, inexpensiveness, durability, and general efficiency.

In the drawings, Figure 1 is a perspective view illustrating my invention as adapted for a combined cultivator and scraper. Fig. 2 is a similar view showing the invention as designed for a harrow or rake. Fig. 3 is a similar view illustrating in detail the means for adjusting and reversing the scraper. Fig. 4 is a detail sectional view taken on the line $x$ $x$, Fig. 1.

Corresponding parts in the figures are denoted by the same letters of reference.

Referring to the drawings, A designates the beam, which may be of any suitable construction and material, and is provided at its forward end with a clevis B. Near the rear end of the beam are secured the lower ends of handles C C of the usual pattern, connected near their upper ends by a brace-rod $c$, and braced from the rear end of the beam by braces $c'$ $c'$.

Near the rear end of the beam A is provided a rectangular mortise D, extending through the same from top to bottom. Within this mortise is adapted to be removably secured the desired tool, such as a cultivator, as shown in Fig. 1, or a harrow or rake, as in Fig. 2. To this end the tool is provided with a tenon E, corresponding to and fitting within the mortise. To secure rigidity of the tool in operation shoulders $e$ $e$ are formed at the lower termination of the tenon, which shoulders fit closely against the under side of the beam. The tool is secured in place by a pin or bolt F, passing transversely through an aperture $f$, provided in the tenon above the beam, said pin or bolt resting closely upon the top of the beam. A brace-rod G is secured to the under side of the beam in advance of the tool, and from its secured front end it extends rearwardly and is detachably attached at its rear end to the tool.

G designates a clip secured around the beam near its forward end and forms a link $g$ at either side of the latter. A bar or rod H is provided, having its forward end bent to form a hook $h$, which is connected with either of the links $g$. This bar or rod extends rearwardly, terminating at a point in advance of the tool before mentioned, and has at its rear end a vertical transverse eye H' and a set-screw $h'$ communicating therewith. Within the eye H' is removably secured the standard I of a scraper or second cultivator, the same being held rigidly in place by the set-screw. For supporting the bar or rod H and also for effecting lateral adjustment of the same a plate J is provided. This plate has in its flat or body portion a series of eyes $j$, any one of which being engaged by a securing-bolt L, passing through the beam. The free end of the plate is bent downwardly adjacent to the bar or rod, and then upwardly to form a hook J', upon which said bar or rod rests. When it is desired to merely adjust the scraper or front cultivator to or from the beam, the bolt L is removed and the plate J shifted to the desired position, the bolt being then passed through the proper eye in the plate and secured to the beam; but to adjust the said tool to the opposite side of the beam the bar or rod H is disconnected from the clip G and transferred to the opposite side of the beam and the plate J reversed.

The operation and advantages of my invention will be readily understood by those skilled in the art to which it appertains. When it is desired to use the implement as either a single cultivator or harrow, the respective tool is secured, as before described, in the mortise provided therefor and the brace-rod G attached thereto. In this case the scraper or second cultivator attachment is detached; but when a double cultivator or a cultivator and scraper are desired the bar or rod H and the plate J are connected to the beam and the proper tool secured to the rear end of said bar or rod, a rear cultivator being secured within the mortise.

I claim as my invention—

1. In a cultivator, the combination, with the cultivator proper, of a reversible bar or rod detachably connected to the beam thereof, a tool removably secured at the rear end of said bar or rod, and a reversible plate adjustably secured to the beam and provided at one end with a hook for supporting the bar or rod, substantially as set forth.

2. In a cultivator, the combination, with the beam carrying a tool and provided near its forward end at either side with links, of a reversible bar or rod provided at its forward end with a hook detachably engaging one of said links and adapted to carry a supplementary tool at its rear end, a reversible plate disposed transversely across the beam and provided with a hook at one end for supporting the bar or rod and with a series of apertures arranged longitudinally therein, and a bolt engaging one of said apertures and adapted to secure the plate to the beam, substantially as and for the purpose set forth.

In testimony whereof I affix my signature in presence of two witnesses.

J. L. WAGENER.

Witnesses:
J. V. ALEXANDER,
B. E. FREAR.